United States Patent [19]

Stekly

[11] 4,290,528

[45] Sep. 22, 1981

[54] MAGNETIC SEPARATING APPARATUS WITH MEANS FOR BALANCING MAGNETIC FORCES

[76] Inventor: Zdenek J. J. Stekly, Hampshire Ct., Wayland, Mass. 01778

[21] Appl. No.: 155,218

[22] Filed: Jun. 2, 1980

Related U.S. Application Data

[63] Continuation-in-part of Ser. No. 881,811, Feb. 27, 1978, abandoned.

[51] Int. Cl.³ .............................................. B03C 1/10
[52] U.S. Cl. ................................. 209/223 R; 209/232; 210/222
[58] Field of Search ................... 209/223 R, 232, 216, 209/217, 230; 210/222, 223, 223 A, 231

[56] References Cited

U.S. PATENT DOCUMENTS

| | | | |
|---|---|---|---|
| 456,507 | 7/1891 | Fishe | 209/230 |
| 731,446 | 6/1903 | Forsgren | 209/217 |
| 1,332,078 | 2/1920 | Sowden | 209/217 |
| 3,375,925 | 4/1908 | Carpenter | 209/217 X |
| 4,054,513 | 10/1977 | Windle | 209/223 R X |

Primary Examiner—Robert Halper
Attorney, Agent, or Firm—Weingram & Klauber

[57] ABSTRACT

Magnetic separator apparatus is disclosed including means for establishing a magnetic field in a predetermined zone, a separating chamber provided with an inlet and an outlet for fluid, fluid-permeable and magnetisable packing material disposed within the separating chamber, a compensating element incorporating ferromagnetic material coupled to said separating chamber, and means for moving the separating chamber and the associated compensating element between a first position in which the separating chamber is within the predetermined zone and a second position in which the separating chamber is outside the predetermined zone. The magnetic field interacting with the compensating element generates balancing forces reducing the force required to move the separating chamber between its two aforesaid positions.

7 Claims, 8 Drawing Figures

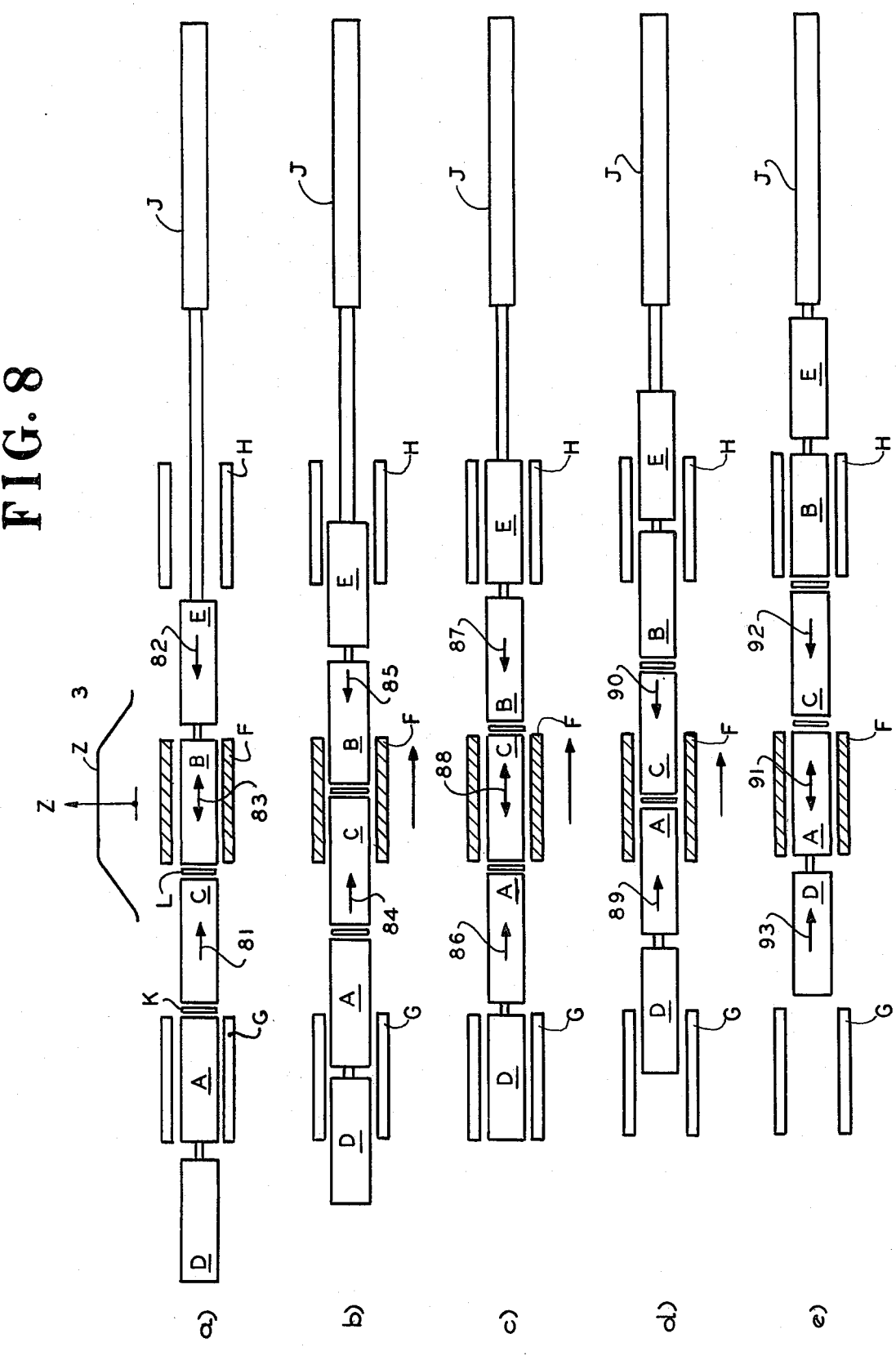

MAGNETIC SEPARATING APPARATUS WITH MEANS FOR BALANCING MAGNETIC FORCES

BACKGROUND AND SUMMARY OF INVENTION

This application is a continuation-in-part of my co-pending application, Ser. No. 881,811, filed Feb. 27, 1978 now abandoned.

This invention relates to a magnetic separator.

According to one aspect of the present invention, there is provided a magnetic separator comprising:

(i) a magnet for establishing a magnetic field in a predetermined zone;

(ii) a separating chamber provided with an inlet and an outlet for fluid;

(iii) fluid-permeable and magnetisable packing material disposed within the separating chamber;

(iv) a compensating element incorporating ferromagnetic material coupled to the separating chamber; and (v) means for moving the separating chamber and the associated compensating element between a first position in which the separating chamber is within the predetermined zone and a second position in which the separating chamber is outside the predetermined zone.

Such an arrangement may be used with advantage in apparatus as described in the U.S. Pat. No. 4,054,513 to William Windle.

According to one aspect of the present invention, there is provided a magnetic separator comprising:

(a) a magnet for establishing a magnetic field in a predetermined zone;

(b) a plurality of elements coupled together to form a train, two of the elements being separating chambers, each provided with an inlet and at least one outlet for fluid, and a further one of the elements disposed intermediate the separating chambers being a compensating element constituted predominantly by ferromagnetic material;

(c) fluid-permeable and magnetisable packing material disposed in each separating chamber; and (d) means for moving the train of elements longitudinally between (i) a first position in which one of the separating chambers is within the predetermined zone and the other separating chamber is outside the predetermined zone, and (ii) a second position in which the other separating chamber is within the predetermined zone and the one separating chamber is outside the predetermined zone.

The object of the compensating element is to reduce the force necessary to move the train with respect to the magnet against the magnetic force applied by the magnet.

The moving means are preferably such as to move the train reciprocatingly between the first and second positions, the one separating chamber being disposed in a first zone remote from the predetermined zone when the train is in the first position and the other separating chamber being disposed in a second zone remote from the predetermined zone when the train is in the second position.

Preferably the train also includes two further compensating elements constituted predominantly by ferromagnetic material, one of these further compensating elements being coupled to one of the separating chambers at one end of the train and the other further compensating element being coupled to the other separating chamber at the other end of the train.

Each of the elements is conveniently cylindrical and of circular cross-section, the compensating elements being of substantially the same size as the separating chambers. The function of the compensating chambers is to enable the separating chambers to be moved out of the predetermined zone without too great a force having to be exerted on the separating chambers to overcome the force exerted on the separating chambers by the magnetic field. Preferably the size of the or each compensating element and the material from which it is made is chosen such that the magnetic force tending to draw that element into the predetermined zone when it is moved into or out of that zone substantially balances the magnetic force tending to draw a separating chamber into that zone when it is moved out of or into that zone. In one embodiment each compensating element comprises a plurality of ferromagnetic discs.

BRIEF DESCRIPTION OF DRAWINGS

In order that the present invention may be more fully understood, an embodiment of a magnetic separator according to the present invention will now be described, by way of example, with reference to the accompanying drawings, in which:

FIG. 8 is a diagrammatic depiction of apparatus of the type shown in FIG. 1, and schematically illustrates the manner in which the invention functions to reduce the forces required to move the train of elements between two of its extreme positions.

DESCRIPTION OF PREFERRED EMBODIMENT

Figure 1:
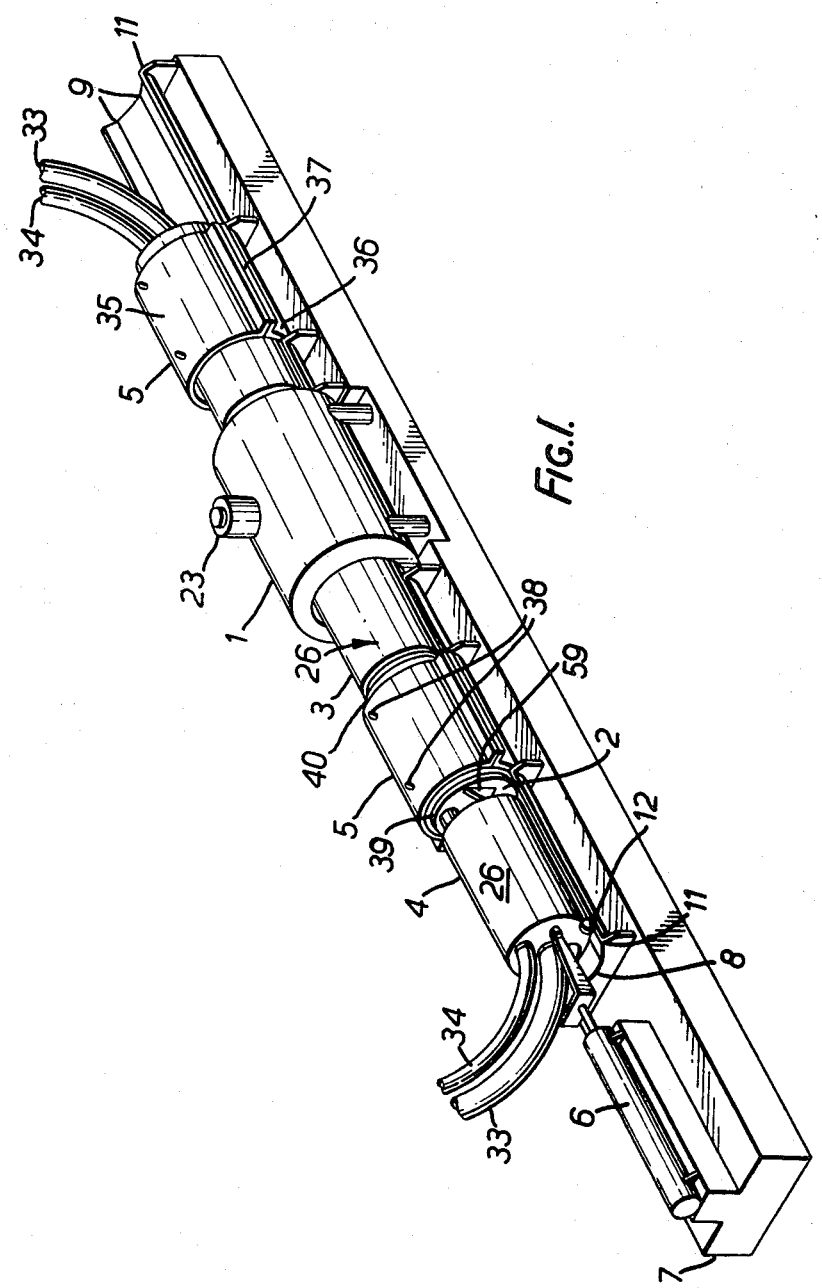
FIG. 1 is a perspective view of this embodiment.
Figure 2:
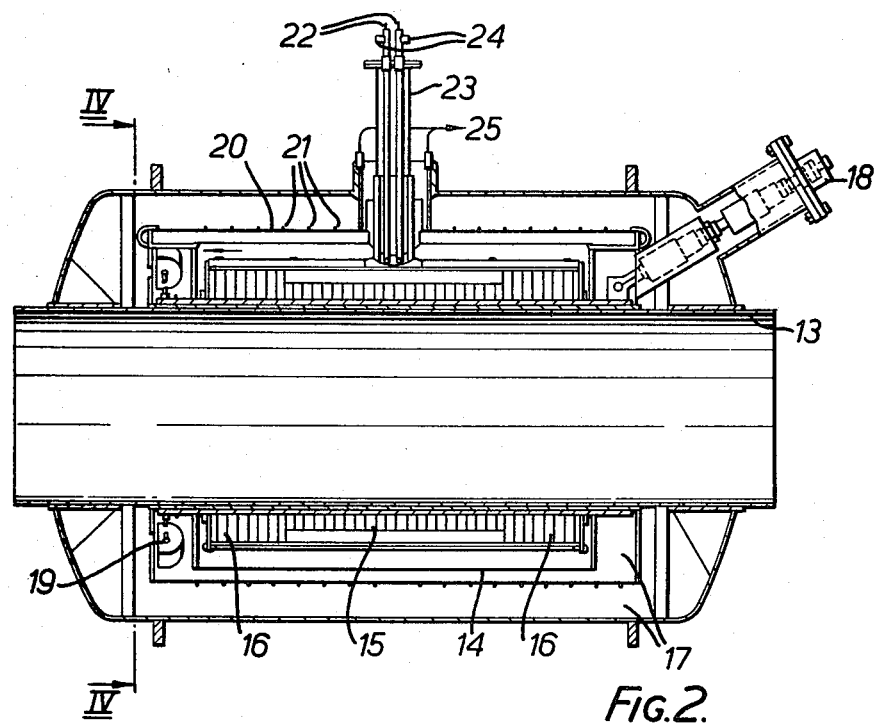
FIG. 2 is a longitudinal sectional view through a superconducting electromagnet forming part of this embodiment.
Figure 3:
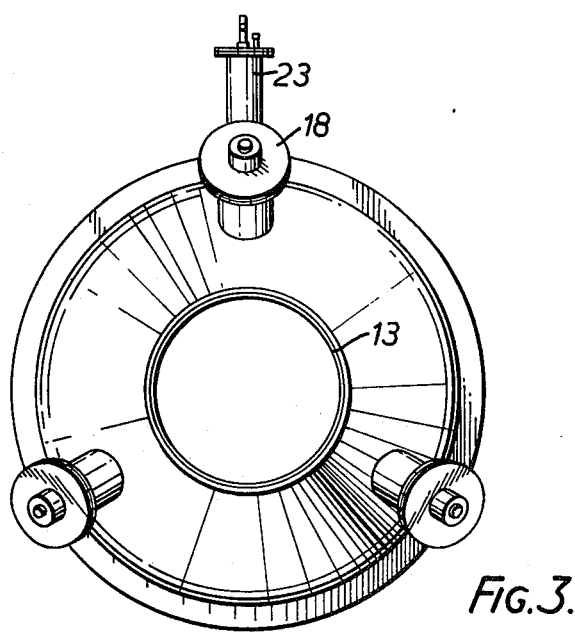
FIG. 3 is an end view of the superconducting electromagnet from the right as shown in FIG. 2.
Figures 4, 5:
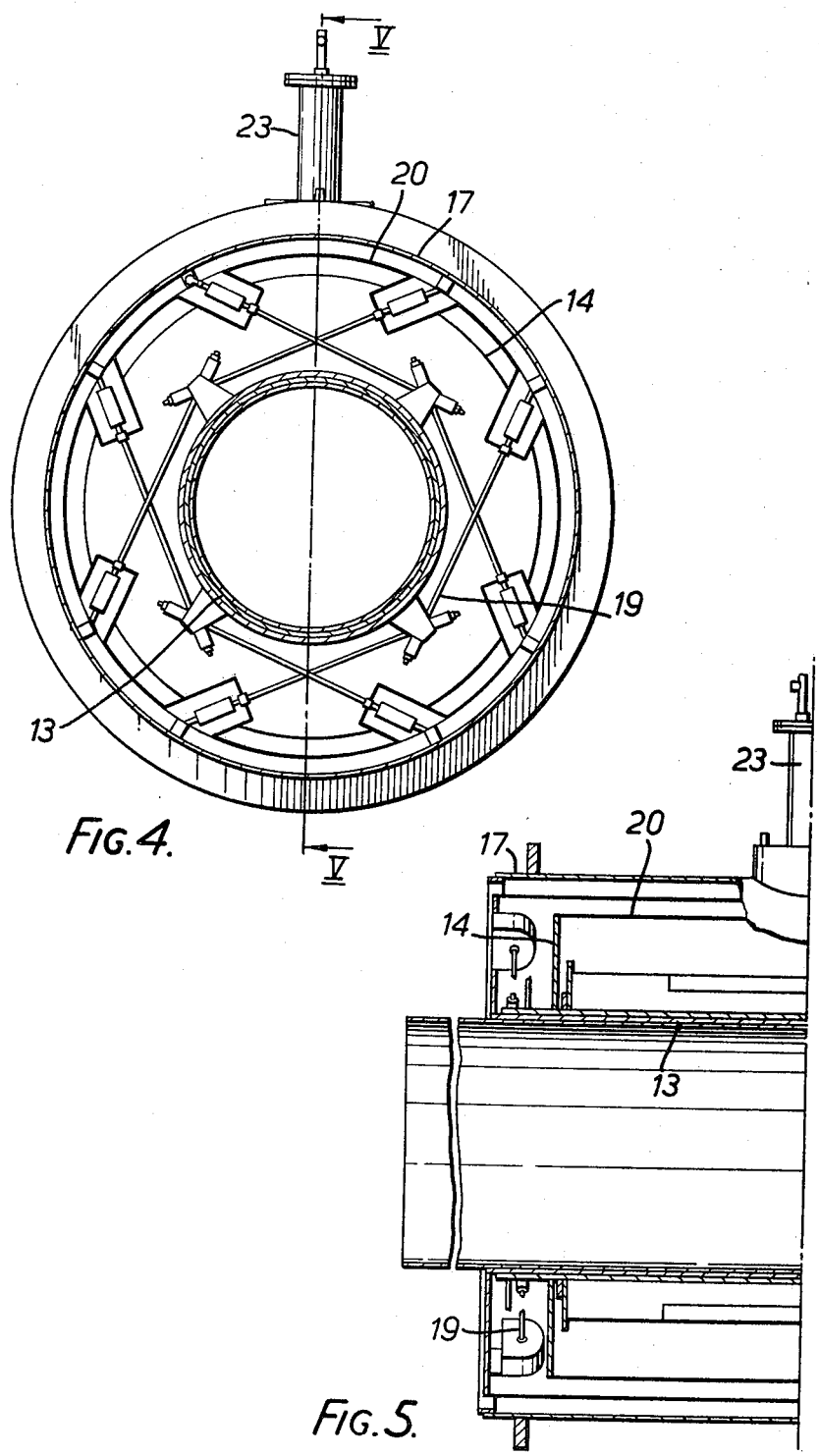
FIG. 4 is a cross-sectional view through the superconducting electromagnet, taken along the line IV—IV in FIG. 2.
FIG. 5 is a sectional view of part of the superconducting electromagnet, taken along the line V—V in FIG. 4.

Referring to FIG. 1, the magnetic separator illustrated therein comprises a superconducting electromagnet 1, two separating chambers 2, a central compensating element 3, two outer compensating elements 4, two ferromagnetic cylindrical shields 5, moving means in the form of a hydraulic ram 6, and a concrete base 7.

The moving means may also be a pneumatic ram or a mechanical device such as a rack and pinion system. The two separating elements are articulated together to form a train of elements which can be reciprocated by means of the hydraulic ram 6 between a first position in which the first separating chamber is within the bore of the electromagnet 1 and the second separating chamber is within the first ferromagnetic shield, and a second position in which the second separating chamber is within the bore of the electromagnet 1 and the first separating chamber is within the second ferromagnetic shield. In operation a magnetic field is established in a predetermined zone within the bore of the electromagnet 1. The train is supported by an arcuate supporting surface 8 in which are set sliding strips 9 of aluminium-bronze alloy lubricated with oil. Further sliding strips (not shown) are provided along the uppermost part of the bore of the superconducting electromagnet 1 and along the uppermost parts of the bores of the ferromagnetic shields 5.

The sliding strips may also be strips of plastics material which exhibit a low coefficient of sliding friction, but it is preferred to use a porous bearing metal to which oil is supplied. Strips of stainless steel 10 (see FIG. 7) are attached to the outside of the separating chambers 2 and the compensating elements 3, 4 and co-operate with the sliding strips. The end portions of the supporting surface 8 extend upwardly to form guide rails 11 on which run rollers 12 mounted on the outer ends of the outer compensating elements 4 in order to prevent rotation of the train about its longitudinal axis. Each compensating element 3, 4 is an assembly comprising an outer, cylindrical casing 26 and six discs of ferromagnetic material, preferably soft iron, (not shown), the assembly being held together by four threaded longitudinal tie rods (not shown). The outer casing 26 and the tie rods are of non-magnetic material, the casing 26 preferably being made of stainless steel.

The thickness, number and position of the ferromagnetic discs in the compensating elements are chosen to be such that, when a separating chamber containing ferromagnetic packing material is withdrawn from the bore of the electromagnet 1 and a compensating element is drawn into the bore, the force opposing the withdrawal of the separating chamber from the bore is balanced by the force tending to draw the compensating element into the bore.

Referring to FIGS. 2 to 5, the electromagnet 1 comprises a central tube 13 surrounding the bore and an annular vessel 14 for containing liquid helium surrounding the tube 13. The electromagnet 1 further comprises a series of electromagnet coils 15, 16 disposed in the vessel 14 and wound from a superconductor consisting of filaments of niobium titanium alloy surrounded by copper. The coils may also be wound from a superconductor consisting of filaments of aluminum of extremely high purity, a noibium tin alloy or a noibium titanium alloy. The electromagnet coils 16 near the ends of the tube 13 have a greater number of windings than the more central coils 15 in order to compensate for fall-off of magnetic field intensity near the ends. The liquid helium is conveniently supplied by a suitable continuous liquifaction plant. The vessel 14 is suspended within an evacuated vessel 17 having silvered inner walls at one end by means of three substantially rigid struts 18 comprising at least a portion of material of low thermal conductivity arranged in tripod formation and at the other end by means of stainless steel rods 19 which are relatively flexible arranged in the manner of the spokes of a wire wheel in order to accommodate radial and longitudinal expansion and contraction of the vessel 14. This method of suspending the vessel 14 allows for thermal expansion and contraction as the temperature of the vessel 14 is raised or lowered, while at the same time minimizing the conduction of heat from outside the vessel 17 to the vessel 14. A thermal shield 20 of good conductivity, for example copper, is disposed between the outer wall of the vessel 14 and the inner wall of the evacuated vessel 17 and is cooled to a temperature intermediate that of liquid helium, and the outside temperature, preferably in the range from 25° K. to 100° K. Advantageously the shield 20 is cooled to about 50° K. by means of tubes 21 attached to the shield 20 carrying helium vapour boiling off from the liquid helium in the vessel 14. Electrical leads 22 for supplying power to the electromagnet coils 15, 16 pass into the vessel 14 by way of a tube 23 which is also cooled by helium vapour boiling off from the liquid helium, thus minimizing conduction of heat down the leads 22. Helium vapour is discharged from outlets 24 and 25 and is returned to a refrigerator for reliquifaction.

Figure 6:
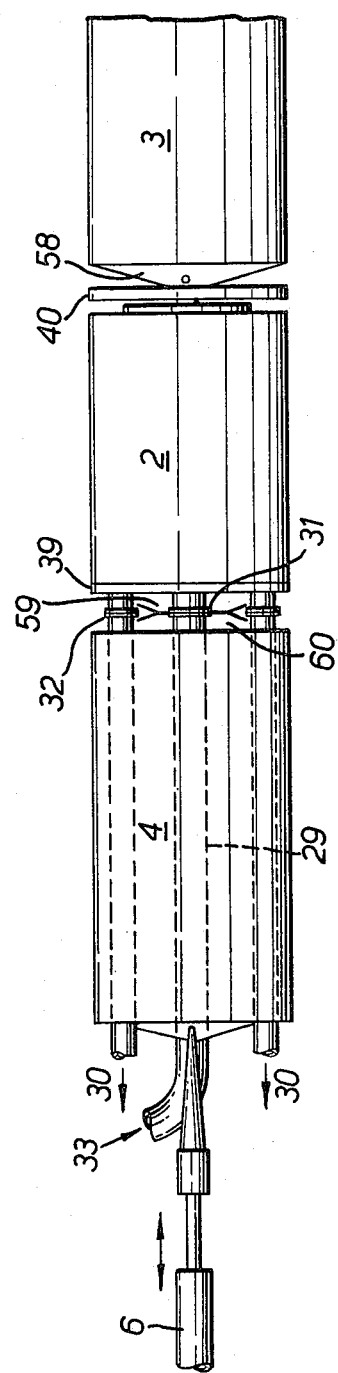
FIG. 6 is a diagram showing the arrangement of various elements of the embodiment.
Figure 7:
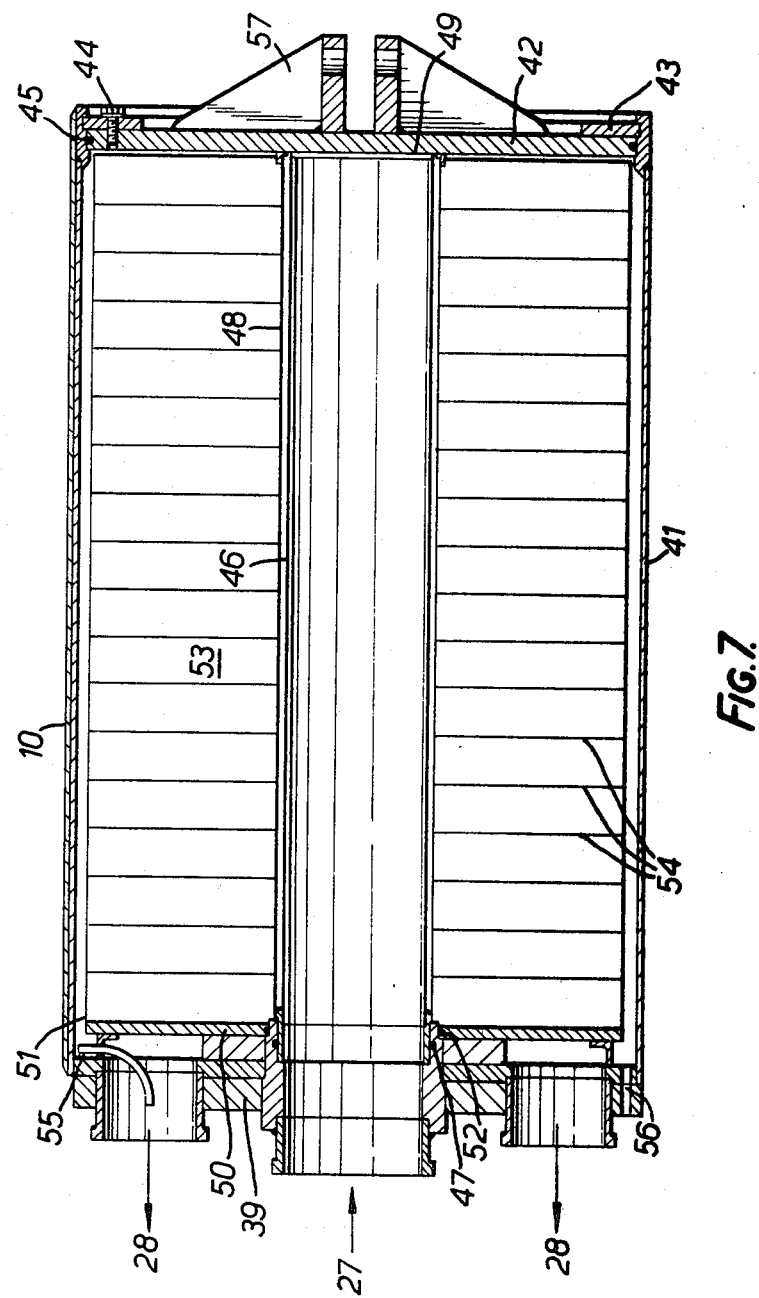
FIG. 7 is a longitudinal chamber forming part of this embodiment.

Referring to FIG. 7, each separating chamber 2 is provided with an inlet 27 for feed suspension and two outlets 28 for product suspension which is substantially free of magnetisable material. Referring also to FIG. 6, the inlet 27 is connected to a conduit 29 and each outlet 28 is connected to a respective conduit 30 by means of coupling means 31 and 32 respectively which allow movement of the inlet 27 and the outlets 28 with respect to the conduits 29 and 30. The conduits 29 and 30 pass through the outer compensating element adjacent the separating chamber and are connected respectively to a flexible conduit 33 for feed suspension and a flexible conduit 34 (see FIG. 1) for product suspension. Each separating chamber 2 also comprises a cylindrical casing of circular cross-section and a removable lid 42 which is held firmly in place on the casing 41 by four arcuate locking members 43 which are secured by screws 44. A water-tight O-ring seal 45 is provided between the rim of the lid 42 and the casing 41. The inlet 27 communicates with an apertured tube 46, an O-ring seal 47 being provided between the tube 46 and the inlet 27. A second apertured tube 48 is disposed coaxially around the tube 46, the spacing between the two tubes 46 and 48 being about 5 mm. The holes in the second tube 48 are offset relative to the holes in the tube 46 to force the feed suspension to follow a tortuous path as it passes from within the tube 46 into a ferromagnetic packing material 53 disposed around the tube 48.

The packing material is preferably of the randomly oriented ferromagnetic filament type such as ferromagnetic stainles steel wood. However other types of packing material such as ferromagnetic particles, foam material or filaments packed singly or in bundles may also be used. A rubber gasket 49 is provided on the inside of the lid 42 to seal the open ends of the tubes 46 and 48.

The packing material 53 is contained by the tube 48, the lid 42, an annular end plate 50 surrounding the inlet 27 and a foraminous cylindrical wall 51 coaxial with the tubes 46 and 48.

The foraminous cylindrical wall 51 is separated from the wall of the tube 46 by a distance of from about 1 cm to about 5 cm. A water-tight O-ring seal 52 is provided between the inner edge of the plate 50 and the inlet 27. The chamber containing the packing material 53 is divided up into a plurality of annular compartments by eighteen annular plates 54 which are fixed at the desired spacing by four threaded tie rods (not shown). The annular plates 54 reduce any permanent compression of the packing material caused by repeated movements of the separating chamber into and out of the bore of the electromagnet 1. The packing material is initially packed into the annular compartments so that about 95% of the available volume is void (i.e., not actually filled with steel). In use, feed suspension enters through the inlet 27 and passes through the slotted tubes 46 and 48. It then flows substantially radially through the packing material 53 and passes through the apertures in the wall 51 into the annular space between this wall and the casing 41 and out of the outlets 28. A venturi tube 55 is provided at the uppermost outlet 28 with one end opening near the uppermost part of the separating chamber and the other end opening in the center of that outlet 28 where the flow velocity of the suspension is high. The function of this venturi tube 55 is to withdraw any air which may collect in the uppermost part of the separating chamber. A drain hole 56 is provided at the lowermost part of the separating chamber to enable the chamber to be completely emptied. With the exception of the packing material all the components of the separating chamber are of non-magnetic material.

Referring again to FIG. 1, each ferromagnetic cylindrical shield 5 which is of slightly greater diameter than each of the separating chambers comprises two semicylindrical halves 35 and 36 having flanges 37 which are bolted together. Furthermore each shield 5 may have a thickness in the range from 25 mm to 50 mm. Lifting eyes 38 are provided on the upper halves to enable them to be removed to facilitate removal and replacement of the compensating elements and separating chambers which make up the train. When a separating chamber is within a cylindrical shield 5, the separating chamber is magnetically screened by this shield as well as by a first soft iron disc 39 of 38 mm thickness attached to the outer end of the separating chamber and a second soft iron disc 40 of the same thickness which forms part of a coupling member (not shown) which connects the separating chamber to the central compensating body 3 (as may be seen more clearly in FIGS. 6 and 7).

Referring to FIGS. 6 and 7, the separating chamber is coupled to the central compensating element 3 by means of a universal joint comprising a clevis 57 which forms part of the lid 42, a pin (not shown) which connects the clevis to the coupling member (not shown) which carries the soft iron disc 40, and a second pin (not shown) at right angles to the first pin which connects the coupling member to a clevis 58 on the central compensating element 3. The separating chamber is coupled to the outer compensating element 4 by means of a clevis 59 which forms part of the casing 41 and which is connected to a clevis 60 on the outer compensating element 4 by a pin (not shown). The articulation of the elements of the train by the system of clevises and pins described above permits any element in the train to be removed and replaced without affecting the other elements of the train. This is especially important when it is desired to replace a separating chamber, the packing material of which has become choked with captured magnetisable particles. The holes in the clevises and the coupling member which receive the connecting pins are provided with resilient bushings to allow for tolerances in manufacture and any slight misalignment of the elements of the train.

The magnetic separator described above with reference to the drawings operates as follows. When the apparatus is operating, a magnetic field is continuously established in the predetermined zone within the bore of the electromagnet 1. The intensity of the magnetic field generated in the bore of the electromagnet 1 may be in the range from 2.5 tesla to 10.0 tesla, but is advantageously about 5 tesla. It is convenient to supply the coils 15, 16 with direct current at a relatively low voltage, for example in the range from 5 to 50 volts and preferably about 15 volts. The coils are preferably energised by increasing the current gradually from zero to a maximum in the range from 500 to 1500 amps. With one of the separating chambers 2 within the predetermined zone and the other separating chamber 2 within the bore of one of the shields 5, feed suspension, for example a clay slurry, is introduced into the one separating chamber by way of the inlet 27. This feed suspension passes into the packing material 53 after following a tortuous path in passing through the tubes 46 and 48. The packing material 53 has been magnetised by the magnetic field and thus magnetisable particles in the feed suspension are magnetised and attracted to the magnetisable material 53 as the feed suspension passes radially through the magnetisable material 53. The product suspension which is substantially free of magnetisable particles passes out of the separating chamber via the outlets 28. Optionally clean water is then passed through the separating chamber from the inlet to the outlets to flush out any substantially non-magnetisable particles which may have become mechanically entrained in the packing material. The hydraulic ram 6 in then actuated to move the train into a position in which the one separating chamber is within the bore of the other shield 5 and the other separating chamber is within the predetermined zone. Feed suspension is then passed through the other separating chamber in the same way as feed suspension was passed through said one separating chamber. Simultaneously the packing material of the one separating chamber within the bore of the other shield 5 may be regenerated, for example by rinsing the magnetisable particles out of the packing material with clean water optionally after having demagnetised the packing material. During this regeneration operation the separating chamber is shielded from the magnetic field applied by the electromagnet 1 by the shield 5 and the soft iron discs 39 and 40. Finally the train is moved back to its original position with the one separating chamber within the predetermined zone and the other separating chamber within the bore of the one shield 5. The packing material of the other separating chamber may then be regenerated while further feed suspension is supplied to the one separating chamber. This separation cycle may be repeated many times with the magnetic field continuously applied.

In FIG. 8 a diagrammatic depiction appears of apparatus of the type thus far described—as for example in FIGS. 1 through 7 herein. The present figure schematically illustrates the manner in which the invention functions to reduce the forces required to move the train of separator elements between two of its extreme positions.

FIG. 8 thus shows a diagrammatic representation of a preferred embodiment of the invention having two separating chambers A and B, a central compensating element C and outer compensating elements D and E. A superconducting electromagnet coil F provides an intense magnetic field in the region of the coil. The intensity Z of the magnetic field as a function of longitudinal distance from the center of the coil is indicated by the curve z. It is to be noted from curve z that the fringe effects of the magnetic field extend symmetrically somewhat to each side of coil F. Two ferromagnetic cylindrical shields G and H provide regions within which the magnetic field intensity is at a sufficiently low value to enable captured magnetisable particles to be separated from the packing material of the separating chamber.

The series of sketches (a) to (e) represent different positions of the reciprocating train of elements which is formed by coupling together the separating chambers and compensating elements in the order indicated. An hydraulic ram J is provided to change the position of the reciprocating train. Ferromagnetic discs K and L are carried on the couplings between the central compensating element C and the two separating chambers A and B coupled thereto, to aid in the screening of a separating chamber from the intense magnetic field while the separating chamber is within one of the cylindrical shields.

In sketch (a) the train is in its extreme left-hand position with the separating chamber B within the electromagnet coil F and the separating chamber A in the cylindrical shield G. There is no net magnetic force acting on separating chamber B because its center line coincides with the center line of the coil F and the force acting on compensating element C by virtue of the magnetic field existing at the left-hand end of the coil F is in the direction shown by the arrow 81 and is balanced by the opposite force 82 acting on compensating element E by virtue of the magnetic field existing at the right-hand end of the coil. The resultant balancing at chamber B is indicated at 83.

In sketch (b) the train has begun to move to the right so that separating chamber B begins to leave the coil F and compensating element C begins to enter it. The compensating element C is designed to have discs of such number, dimensions and spacing that the sum of the intensities of the magnetic poles induced in the compensating element per unit length is as nearly as possible equal to the sum of the intensities of the magnetic poles induced in the packing material of the separating chamber per unit length.

The force 84 acting on compensating element C is therefore equal and opposite to the force 85 acting on separating chamber B.

In sketch (c) the train has moved further to the right and compensating element C is wholly within the coil F. There is therefore no net force acting upon compensating element C and the force 86 acting on separating chamber A is equal and opposite to force 87 acting upon separating chamber B. The balancing of forces at C is indicated at 88.

In sketch (d) separating chamber A has begun to enter the coil and compensating element C has begun to leave the coil. The force 89 acting upon separating chamber A is equal and opposite to force 90 acting upon compensating element C.

In sketch (e) the train has come to rest with separating chamber A wholly within the coil and separating chamber B in the cylindrical shield H. As indicated at 91, there is no net magnetic force acting upon separating chamber A, and the force 92 acting upon compensating element C is exactly balanced by the force 93 acting on compensating element D.

Thus it may be seen that, if the train of elements consists of two separating chambers and three compensating elements coupled together alternately, the magnetic forces acting on the elements of the train by virtue of the field established by the superconducting electromagnet coil, are at all times substantially completely balanced, while at the same time the cylindrical shields can be positioned at a sufficiently great distance from the coil so that they are outside the region of high intensity of the field established by the coil.

The magnetic separator described above is a wet magnetic separator and is suitable for a wide range of separations in the mineral and chemical industries. It is especially adapted for separating magnetisable impurities from kaolinitic clays.

The annular plates 54 are spaced apart by pointed pins (not shown) provided on the face of each of the plates 54, which pins extend into holes in the opposite face of an adjacent plate 54. Some of the pins are hollow in order that they may accommodate the tie rods. The pins also serve to reinforce the packing material so as to decrease compaction of the packing material by the fluid. Preferably twenty-four pins each of $\frac{1}{4}$ inch diameter are provided between each pair of adjacent plates and four of these twenty-four pins are hollow so that they may accommodate the tie rods which are preferably of $\frac{1}{8}$ inch diameter.

The inner of the two tubes 46 and 48 is preferably provided with circular holes and the outer of the two tubes 46 and 48 is preferably provided with slots. The size and distribution of the holes in the inner tube 46 are chosen such as to evenly distribute the feed suspension along the length of the tube as it passes into the packing material by causing a pressure drop in the suspension. Preferably the holes occupy an area in the range from 2% to 10%, and most preferably 4% to 5%, of the total area of tube surface (including the holes). Thus the holes may be evenly distributed at a density of sixteen holes per square inch if the holes are of 1/16 inch diameter, that is with the centers of the holes spaced apart by $\frac{1}{4}$ inch. The inner tube 46, which is for example of 6 inch diameter, may be formed by bending a preformed apertured sheet. The outer tube 48, which preferably surrounds the tube 46 at a distance in the range from $\frac{1}{8}$ inch to $\frac{1}{2}$ inch, has axially extending slots which are offset radially from these apertures so as to decrease the velocity of the jets of feed suspension passing through the holes in the tube 46, thus increasing the chance of the magnetisable particles in the feed suspension being captured within the packing material. The slots may each be about $\frac{1}{8}$ inch wide and about three inches long, the centers of adjacent slots being spaced apart by about $\frac{1}{4}$ inch. The slots are arranged end to end along the length of the tube with the ends of longitudinally adjacent slots being spaced apart by about $\frac{1}{2}$ inch.

The moving means is advantageously constituted by two hydraulic rams, such as 6, one disposed at either end of the train. Reciprocating movement of the train may then be achieved by alternately pulling the train with each of the rams and it is not necessary to exert a pushing force on the train which may cause the train to skate from side to side.

I claim:

1. Magnetic separator apparatus comprising:

means for establishing a magnetic field in a predetermined zone;

a separating chamber provided with an inlet and an outlet for fluid;

fluid-permeable and magnetisable packing material disposed within said separating chamber;

a compensating element incorporating ferromagnetic material, being adjacent and coupled to said separating chamber; and means for moving said separating chamber and said coupled compensating element in a common direction to thereby move said separating chamber between a first position in which the separating chamber is within the predetermined zone and a second position in which the separating chamber is outside the predetermined zone, while simultaneously bringing said adjacent compensating element into said predetermined zone and displacing said separating chamber thereat;

said compensating element having a size and a distribution of ferromagnetic material therein such that the magnetic force tending to draw said element into said predetermined zone when it is moved into said zone by said moving means, substantially balances the magnetic force resisting displacement of said separating chamber when it is moved from said zone by said moving means; the said magnetic field thereby interacting with said compensating element as said element displaces said separating chamber at said predetermined zone, to generate balancing forces reducing the force required to move said separating chamber between its two said positions.

2. Apparatus in accordance with claim 1, wherein conduits coupled to the inlet and outlet of the separating chamber extend through the compensating element adjacent the separating chamber.

3. Apparatus in accordance with claim 1, wherein the compensating element and separating chamber are connected together in articulated manner.

4. A magnetic separator apparatus comprising:

magnetic means for establishing a magnetic field in a predetermined zone;

a plurality of elements coupled together to form a train, two of said elements being separating chambers, each provided with an inlet and at least one outlet for fluid, and a further three of said elements being compensating elements comprised predominatly by ferromagnetic material, one of said compensating elements being disposed intermediate said separating chambers, the opposed ends of said intermediate compensating element being each adjacent a said separating chamber, and one of said further compensating elements being adjacent and coupled to one of the said separating chambers at one end of the train, and the other of said further compensating elements being adjacent and coupled to the other of said separating chambers at the other end of said train;

fluid-permeable and magnetisable packing material being disposed in each said separating chamber; and means for moving said train of elements longitudinally between (i) a first position in which one of the said separating chambers is within the predetermined zone and the other separating chamber is outside the predetermined zone, and (ii) a second position in which the other separating chamber is within the predetermined zone and the one separating chamber is outside the predetermined zone, said means bringing said adjacent intermediate compensating element into said predetermined zone while displacing said one separating chamber therefrom, and thereupon bringing said other separating chamber into said predetermined zone while displacing said compensating element therefrom; said compensating elements having a size and a distribution of ferromagnetic material therein such that the magnetic force tending to draw a said element into said predetermined zone or resist displacement of said element from said zone when it is moved to or from said zone by said moving means, substantially balances the magnetic force tending to draw a said separating chamber into said zone or resist displacement of a said chamber from said zone when it is moved to or from said zone by said moving means; the said magnetic field thereby interacting with said compensating elements as said intermediate element displaces said one separating chamber at said predetermined zone and is subsequently displaced by said other chamber at said zone, to thereby generate balancing forces reducing the force required to move said train between said first and second positions.

5. Apparatus in accordance with claim 4, wherein said moving means move the said train reciprocatingly between said first and second positions, the one separating chamber being disposed in a first zone remote from the predetermined zone when the train is in the first position and the other separating chamber being disposed in a second zone remote from the predetermined zone when the train is in the second position.

6. Apparatus in accordance with claim 5, wherein said compensating elements are cylindrical and of circular cross-section, the said compensating elements being of substantially the same size as the separating chambers.

7. Apparatus in accordance with claim 6, wherein each said compensating element comprises a plurality of ferromagnetic discs.

* * * * *